(12) United States Patent
Fuentes Weishaupt et al.

(10) Patent No.: US 12,228,443 B2
(45) Date of Patent: Feb. 18, 2025

(54) MEASUREMENT SYSTEM FOR THE PHASE LEVEL IN A SMELTING FURNACE

(71) Applicant: CODELCOTEC SPA, Santiago (CL)

(72) Inventors: Claudio Fuentes Weishaupt, Santiago (CL); Leonel Contreras Rojas, Santiago (CL); Rodolfo Weishaupt Silva, Santiago (CL)

(73) Assignee: CODELCOTEC SPA, Santiago (CL)

( * ) Notice: Subject to any disclaimer, the term of this patent is extended or adjusted under 35 U.S.C. 154(b) by 69 days.

(21) Appl. No.: 17/756,578

(22) PCT Filed: Nov. 27, 2020

(86) PCT No.: PCT/CL2020/050163
§ 371 (c)(1),
(2) Date: May 27, 2022

(87) PCT Pub. No.: WO2021/102597
PCT Pub. Date: Jun. 3, 2021

(65) Prior Publication Data
US 2023/0003569 A1    Jan. 5, 2023

(30) Foreign Application Priority Data

Nov. 29, 2019 (CN) .......................... 201911199245.0

(51) Int. Cl.
*G01F 23/24* (2006.01)
*F27D 27/00* (2010.01)

(52) U.S. Cl.
CPC ........... *G01F 23/246* (2013.01); *F27D 27/00* (2013.01)

(58) Field of Classification Search
CPC .............................................. G01F 23/24–268
See application file for complete search history.

(56) References Cited

U.S. PATENT DOCUMENTS

| | | | | |
|---|---|---|---|---|
| 3,301,056 A | * | 1/1967 | Blanchard | G01F 23/266 |
| | | | | 73/304 C |
| 3,370,466 A | * | 2/1968 | Chang | G01F 23/243 |
| | | | | 73/304 R |
| 3,418,541 A | * | 12/1968 | Adams | H01H 47/223 |
| | | | | 361/152 |

(Continued)

FOREIGN PATENT DOCUMENTS

| | | | | |
|---|---|---|---|---|
| CN | 104236669 A | * | 12/2014 | ............. G01F 23/14 |
| CN | 208595948 U | | 3/2019 | |

(Continued)

OTHER PUBLICATIONS

May 13, 2021—(WO) International Search Report and Written Opinion—App PCT/CL2020/050163.
Feb. 6, 2024 (CN) Office Action—App PCT/CL2020/050163.

*Primary Examiner* — Justin N Olamit
(74) *Attorney, Agent, or Firm* — LUCAS & MERCANTI, LLP

(57) ABSTRACT

This application addresses a wireless system for the determination of the height of liquid or molten metal levels containing metal, shaft, matte or slag in smelting furnace. Specifically, it addresses a wireless system that allows, without the presence of cables, the sending and receiving of a signal outside of the smelting furnace, in order to determine, on-line, the height of the phases, including the height of the slag-matte interface and the total level of the bath.

7 Claims, 3 Drawing Sheets

(56) References Cited

U.S. PATENT DOCUMENTS

| | | | | |
|---|---|---|---|---|
| 8,482,295 | B2* | 7/2013 | Sadri | G01F 23/284 |
| | | | | 73/304 C |
| 10,205,283 | B2* | 2/2019 | Dickey | H01R 24/20 |
| 10,605,642 | B1* | 3/2020 | Taylor | G01F 23/80 |
| 11,201,496 | B2* | 12/2021 | Narla | B60L 50/66 |
| 11,820,026 | B2* | 11/2023 | Cote | B25J 13/087 |
| 2003/0212505 | A1* | 11/2003 | Rojas | C21C 5/4673 |
| | | | | 702/39 |
| 2007/0062334 | A1* | 3/2007 | Barriga | G01F 23/243 |
| | | | | 266/94 |
| 2021/0381874 | A1* | 12/2021 | Pankov | G01F 25/20 |

FOREIGN PATENT DOCUMENTS

| | | | | |
|---|---|---|---|---|
| DE | 202015106880 U1 * | 2/2016 | | B22D 2/003 |
| EP | 0037357 A1 | 10/1981 | | |
| JP | 562169022 A | 7/1987 | | |
| JP | H4167962 A | 6/1992 | | |
| JP | 2019068677 A * | 4/2019 | | |
| WO | WO-9418528 A1 * | 8/1994 | | G01F 23/241 |

* cited by examiner

MEASUREMENT SYSTEM FOR THE PHASE LEVEL IN A SMELTING FURNACE

This application addresses a wireless system to determine the height of liquid or molten metal levels within metal, shaft, matte or slag smelting reactors. Specifically, it addresses a wireless system that allows, without the presence of cables, the sending and receiving of a signal outside of the smelting bath to determine, in line, the height of the phases, enabling the height of the slag-matte interface and total level of the bath to be obtained.

BACKGROUND

In pyrometallurgical reactors, there are fundamentally three immiscible products that coexist, which have different compositions and physical-chemical properties: Gas, Matte (high-grade phase) and Slag (low-grade phase). These are separated in phases, thus presenting a Gas-Slag interface and another Slag-Matte interface, the heights of which, with respect to the bottom of the reactor, are known as the total level and matte level, respectively.

The solution described in patent registration CL49,311 constitutes the basis for this invention patent application. Said registration describes a method and system to determine the height of liquid or molten metal levels within metal, shaft, matte or slag pyrometallurgical smelting reactors. Specifically, the system consists of using alternating current electrical signals emitted by a modulated signal generator and continuous electrical signals to a processor so that once said electrical signal circulates, the electrical resistors offered by the areas between said electrodes can be learned to thus obtain a measurement of the height of said phases inside said reactor.

Conceptually, the height of the levels is determined by measuring the electrical resistors of the phases present within a pyrometallurgical reactor. For this purpose, it is known that the measurements of specific electrical conductances (inverse of resistivities) show differences of various orders of magnitude between matte and slag, for example, for white metal and slag, the studies conducted by Pound, G. M., Degre, G. and Osuch, G. (1955) "*Electrical conduction in molten Cu—Fe sulfide mattes.*" Trans A.I.M.E. 203, 481-484, show values of 300 to 1000 $\Omega^{-1}\text{cm}^{-1}$ in white metal and 0.5 $\Omega^{-1}\text{cm}^{-1}$ in slag. Similar results were obtained by Otero, A. and Garcia, M. (1992) "*Study of height level measurement of molten phases in copper concentrate converter furnaces.*" CIMM, Extractive Metallurgical Division, P-833, in which studies were conducted of the electrical properties of the molten phases coexisting inside copper concentrate melting furnaces. Based on this, the method described in registration CL49,311 proves that it is possible to take advantage of these electrical differences in the phases in question for the construction of a method and system capable of measuring both the total level of the metallurgical bath as well as the level of the slag-white metal interface.

For its part, the system via which the measurement is taken of the height of liquid or molten metal levels within pyrometallurgical smelting reactors for metals, shaft, matte or slag is comprised of a signal generator and a signal processor. Said generator sends an electrical signal to said processor, which is connected to a set of electrodes placed in the housing of a pyrometallurgical reactor. Said electrodes penetrate the housing and are in electrical contact with the phases, so as to be located in the area where it is desired to know the height of the levels of slag and metal. Once installed, said electrodes form an assembly of resistors in series via which said electrical signal flows.

Unlike that described in patent registration 49,311, this invention is comprised of a wireless system of connection between the means of control and the means of generation and reception of signals, which allows the remote operation of the system to measure the height of the levels of phases within the furnace, thus improving not only the service life of the equipment, but also the safety of human resources, since there is no need to be close to the high temperatures of the furnaces.

DETAILED DESCRIPTION OF THE INVENTION

The wireless system to measure the height of liquids within a melting furnace is comprised of a programmable logic controller (PLC) equipped with a wireless transmitter-receiver device that has analog inputs and discrete outputs connected to a circuit of solid-state and electromechanical relays (3). Said circuit is connected to electrodes (1) placed in a melting furnace (2), said electrodes being submerged in a specific phase of the metallurgical bath within the furnace. Said programmable logic controller is connected via said transmitter-receiver device to a control interface.

The circuit may be comprised of connection points, which are organized in an assembly of pairs of terminals assigned the letter E, and another assembly of pairs of terminals assigned the letter R. Each pair of terminals has a pair of relays that will be used to control, that is to say enable/disable, the flow of the current and to measure voltage. It is noteworthy that this will depend on the type of furnace, the definition of the measurement that needs to be performed for an operation and the number of connection points required to measure the height of phases within said furnace. It is estimated that this could entail a minimum of three connection points and a maximum of 40 connection points. Additionally, the number of connection points will depend on the number of terminal pairs used in the system. It is estimated that one pair of terminals assigned the letter E will be used for approximately every three connection points, and that one pair of terminals assigned the letter R will be used for approximately every five connection points.

Figure 1:
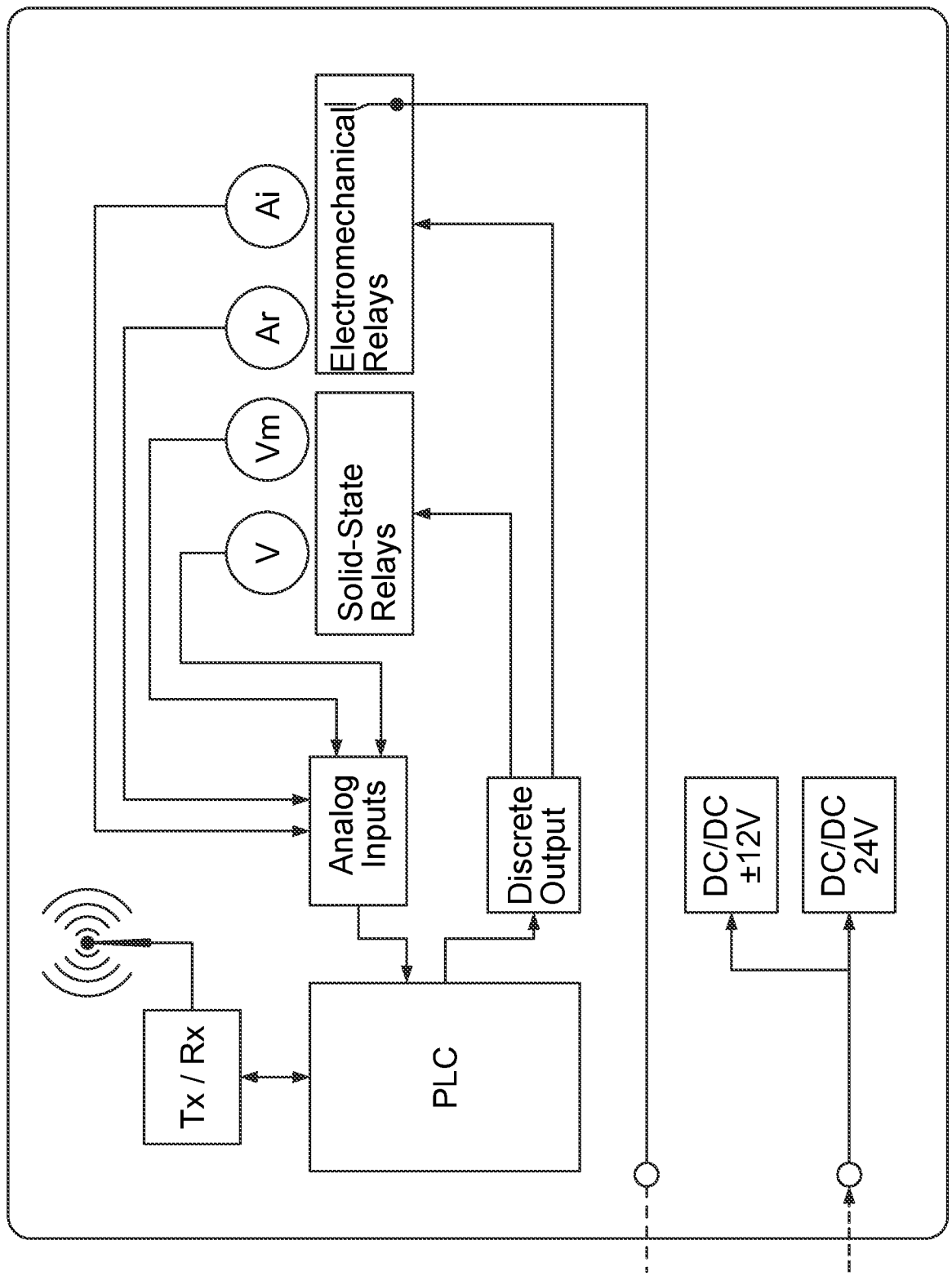
FIG. 1: represents an illustrative diagram of the components of the invention's wireless system.
Figure 2:
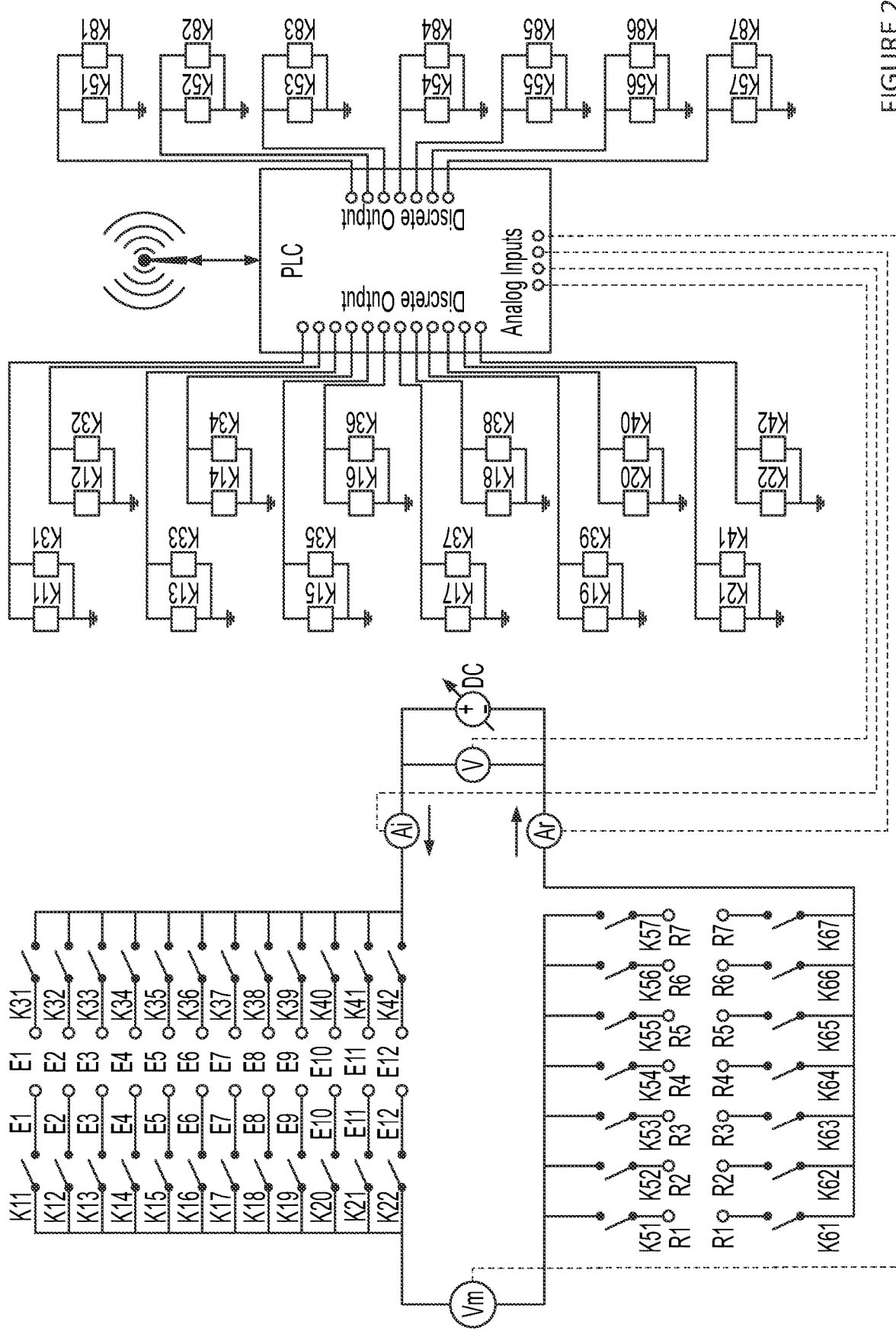
FIG. 2: represents an illustrative diagram of the location of the circuit that comprises the invention's wireless system.
Figure 3:
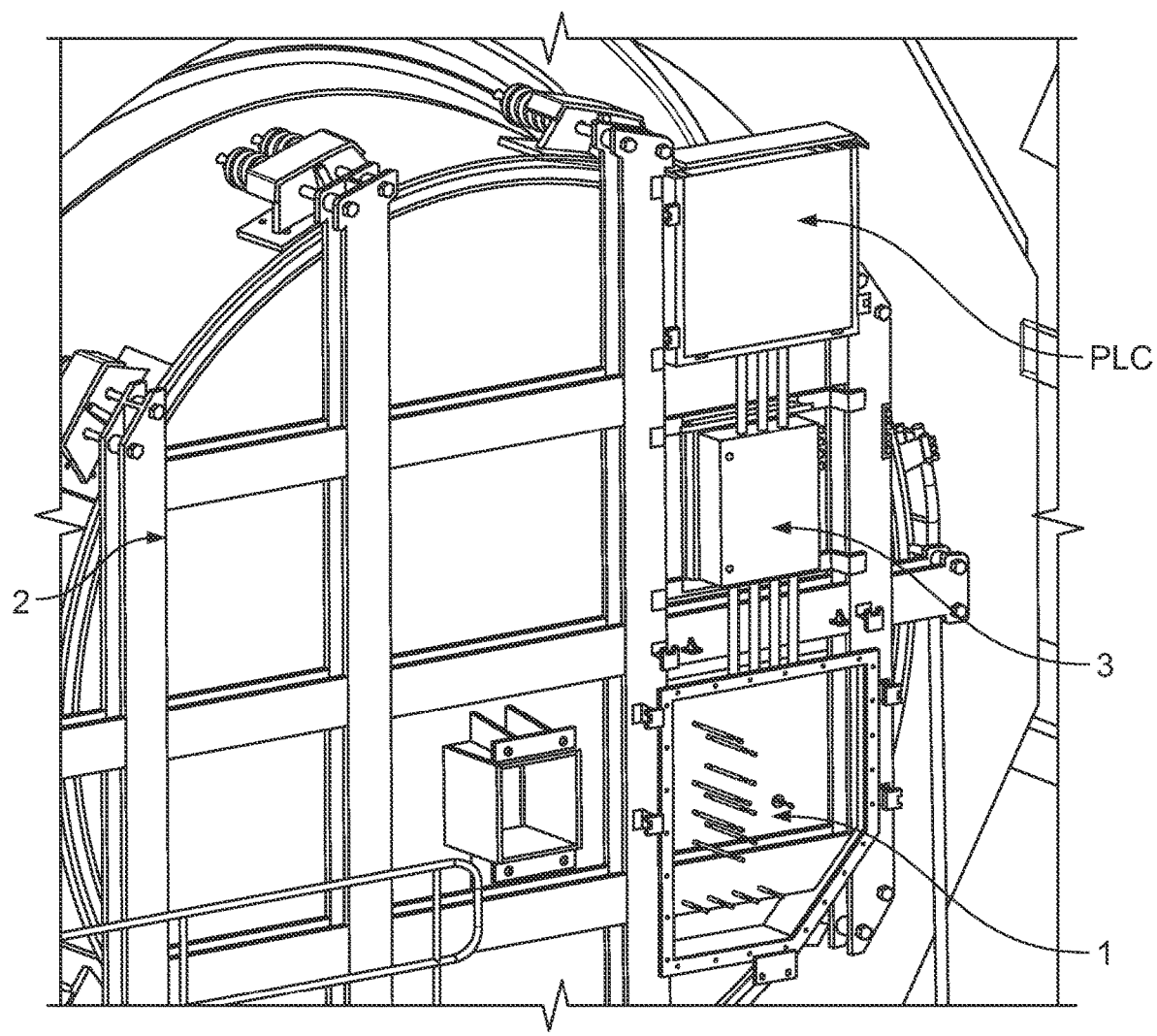
FIG. 3: represents an isometric view of a melting furnace with the invention's system and its components duly installed for operation.

It can be observed from the diagram in FIG. 2 that each pair of terminals has a corresponding discrete Control outlet (from the PLC) for the activation/deactivation thereof.

This system is used in an industrial environment, with constant temperatures of close to or approximately 60° C. Strictly speaking, the circuit is within a cabinet designed to support an ambient temperature of 300° C., in accordance with the temperature of the exterior of the melting furnace (2). The invention's system is designed to function 24 hours a day.

The terminals assigned the letter R are activated in pairs, namely pairs K51/K61 (Terminals R1), K52/K62 (Terminals R2) and successively until K57/K67 (Terminals R7). Terminal changes are to be defined by the operator, who in this manner selects the circuit to be used. The operation of the system starts with the activation of a pair of relays (linked to a pair of terminals) in this assembly. This occurs prior to the activation of the relays of assembly E. The operator must have the ability to indicate which terminals are in use and which terminals are in reserve (the latter must be inactive).

[That is to say], from the control interface connected wirelessly [to] said PLC.

The terminals assigned the letter E allow the switching of relay pairs, activating in tandem K11/K31 (Terminal E1), then K12/K32 (Terminal E2) and successively until reaching K22/K42 (Terminal E12). Switching is cyclical, for which reason after completing the sequence, it must be started again. The programming of these terminals provides the liberty to assign terminals in use and terminals in reserve, considering for the performance of the cycle solely those terminals in use and always respecting the sequence in ascending order (from the terminal with the lowest number to the terminal with the highest number). The definition of which terminal is in reserve and which is in use must be provided by the operator from said control interface.

Only one pair should be activated at a time and the activation period for each pair of relays will vary between two and ten seconds.

After completing one cycle (that is to say, one complete sweep by the terminal pairs assigned the letter E), the data will proceed to be transmitted. A communication string will be created for this purpose. The string should contain the Input Current (Ai), Return Current (Ar), Measured Voltage (Vm) and Source Voltage (V) measurements for the pair of active "R" terminals, along with the date, time and pair of active "E" terminals, in text format or a similar chain.

As already explained, the wireless device is comprised of an emitter and receiver, wherein the measurements received from the electrodes are stored at a station connected to the control interface that has the capacity to keep a historic record for at least six months or, failing this, a server that can recover and store this data.

Structurally, the system includes the connection from a control card in the PLC to the relay bobbin. The connection to the relay contacts is made via standard terminal boards.

The control interface has a local storage buffer with at least a five-day capacity.

The control interface is located in the wireless communication reception point (including transmission from the PLC side). This is where the operator adjusts the parameters for the "selected R terminals," injection current at the source, the date and time and the terminals in use and in reserve for the R and E terminals.

The power outlets for this system will be from a Wiring Cabinet, which will include two outlets, the first of which will have a voltage of 24 VDC, which will power the DC-DC converter, and the second will be a source of adjustable voltage, which will provide power to the terminal boards.

The invention claimed is:

1. A wireless system adapted to determine a height of levels of liquid or molten metals within metal, shaft, matte or slag pyrometallurgical smelting reactors, comprising:
a programmable logic controller equipped with a wireless transmitter-receiver device that has analog inputs and discrete outputs connected to a circuit of solid-state and electromechanical relays;
one or more electrodes connected to the circuit, the one or more electrodes being disposed in a melting furnace, the one or more electrodes being submerged in a specific phase of a metallurgical bath within the melting furnace;
wherein the programmable logic controller is connected via the transmitter-receiver device to a control interface;
wherein the circuit comprises at least three connection points;
wherein the circuit further includes:
a first plurality of pairs of first terminals, each pair of first terminals connected to the circuit by at least one corresponding first switch, each pair of first terminals having a permanently open configuration; and
a second plurality of pairs of second terminals, each pair of second terminals connected to the circuit by at least one corresponding second switch, each pair of second terminals having a permanently open configuration;
wherein the first plurality of pairs of first terminals and the second plurality of pairs of second terminals are adapted to enable a flow of current through a selected pair of first terminals and a selected pair of second terminals, in series, when the at least one first switch corresponding to the selected pair of first terminals is closed and the at least one second switch corresponding to the selected pair of second terminals is closed.

2. The wireless system in accordance with claim 1, wherein each pair of first terminals and each pair of second terminals includes a pair of switches adapted to control the flow of current and measure voltage.

3. The wireless system in accordance with claim 1, wherein the circuit is disposed within a cabinet adapted to support an ambient temperature of 300° C.

4. The wireless system in accordance with claim 1, further comprising a connection from a control card in the programmable logic controller to a bobbin for the electromechanical relays.

5. The wireless system in accordance with claim 4, wherein the connection is made via terminal boards.

6. The wireless system in accordance with claim 1, wherein the control interface includes a local storage buffer with at least a five-day capacity.

7. The wireless system accordance with claim 1, further comprising a first power outlet adapted to provide a voltage of 24 VDC, the first power outlet adapted to power a DC-DC converter, and a second power outlet adapted to provide an adjustable voltage, the second power outlet adapted to provide power to one or more terminal boards.

* * * * *